US008908208B2

(12) United States Patent
Ono

(10) Patent No.: US 8,908,208 B2
(45) Date of Patent: Dec. 9, 2014

(54) IMAGE PROCESSING APPARATUS, UNAUTHORIZED USE PREVENTING METHOD, AND STORAGE MEDIUM

(75) Inventor: Yohei Ono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 223 days.

(21) Appl. No.: 13/310,049

(22) Filed: Dec. 2, 2011

(65) Prior Publication Data

US 2012/0154847 A1 Jun. 21, 2012

(30) Foreign Application Priority Data

Dec. 16, 2010 (JP) ................................. 2010-280072

(51) Int. Cl.
*G06F 3/12* (2006.01)
*G06K 15/00* (2006.01)
(52) U.S. Cl.
CPC .......... *G06K 15/4095* (2013.01); *G06F 3/1222* (2013.01); *G06F 3/1239* (2013.01); *G06F 3/1285* (2013.01); *G06K 15/005* (2013.01)
USPC .......................... 358/1.15; 358/1.14; 358/1.13
(58) Field of Classification Search
CPC .... G06F 3/1238; G06F 3/1239; G06F 3/1273
USPC .............. 358/1.13–1.16; 726/6, 7; 340/572.1, 340/5.2, 5.21, 5.61, 5.8, 539.1
See application file for complete search history.

(56) References Cited

U.S. PATENT DOCUMENTS

| | | | | |
|---|---|---|---|---|
| 7,355,759 | B1 * | 4/2008 | Kokusho | 358/440 |
| 7,889,366 | B2 * | 2/2011 | Nishiyama | 358/1.14 |
| 2001/0056463 | A1 * | 12/2001 | Grady et al. | 709/203 |
| 2002/0089693 | A1 * | 7/2002 | Maruyama | 358/1.15 |
| 2006/0001897 | A1 * | 1/2006 | Ogasawara | 358/1.13 |
| 2006/0099947 | A1 * | 5/2006 | Shozaki et al. | 455/435.1 |
| 2006/0195536 | A1 * | 8/2006 | Tsuboi et al. | 709/206 |
| 2007/0018785 | A1 * | 1/2007 | Chi | 340/5.2 |
| 2009/0009800 | A1 * | 1/2009 | Jung | 358/1.15 |
| 2010/0188681 | A1 * | 7/2010 | Kawano | 358/1.13 |
| 2010/0229231 | A1 * | 9/2010 | Iwai | 726/7 |
| 2010/0245899 | A1 * | 9/2010 | Hirama | 358/1.15 |
| 2011/0090530 | A1 * | 4/2011 | Kawakami et al. | 358/1.15 |

FOREIGN PATENT DOCUMENTS

| | | |
|---|---|---|
| JP | 2004-295821 | 10/2004 |
| JP | 2008-186042 | 8/2008 |
| JP | 2009-157531 | 7/2009 |

* cited by examiner

*Primary Examiner* — Dennis Dicker
(74) *Attorney, Agent, or Firm* — IPUSA, PLLC

(57) ABSTRACT

An image processing apparatus includes a storing unit configured to store comparison data; an analysis unit configured to analyze a print job sent by a requesting user from an information processing apparatus to obtain user information of the requesting user; a comparison unit configured to compare the obtained user information with the comparison data to determine whether registered user information corresponding to the obtained user information is present in the comparison data; and a registration unit configured to register the obtained user information as the comparison data of an authorized user if the registered user information corresponding to the obtained user information is not present in the comparison data. The comparison unit is configured to control execution of a printing process and/or an error process if the registered user information corresponding to the obtained user information is present in the comparison data.

13 Claims, 11 Drawing Sheets

FIG.4A

■ USER IDENTIFICATION INFORMATION SETTING   W1

| | OPTIONS |
|---|---|
| ● | LOGGED-ON USER NAME |
| ○ | USER ID |
| ○ | PRINT-REQUESTING HOST NAME |
| ○ | PRINT-REQUESTING HOST IP ADDRESS |
| ○ | ... |

[ OK ]  [ CANCEL ]

FIG.4B

■ USER-RELATED INFORMATION SETTING   W2

| | OPTIONS |
|---|---|
| ● | ICON NAME |
| ● | PRINT-REQUESTING HOST IP ADDRESS |
| ○ | PRINT-REQUESTING HOST MAC ADDRESS |
| ● | DRIVER TYPE |
| ○ | ... |

[ OK ]  [ CANCEL ]

FIG.5

| USER IDENTIFICATION INFORMATION | USER-RELATED INFORMATION | | |
|---|---|---|---|
| LOGGED-ON USER NAME | PRINT-REQUESTING HOST IP ADDRESS | ICON NAME | DRIVER TYPE | ... |
| User01 | 192.168.XX.XX1 | PRINTER01 | DRIVER01 | ... |
| User02 | 192.168.XX.X11 | PRINTER01 | DRIVER02 | ... |
| User03 | 192.168.XX.11X | PRINTER01 | DRIVER03 | ... |
| ... | ... | ... | ... | ... |

| ERROR PROCESS SETTING | | |
|---|---|---|
| | OPTIONS | |
| ● | REPORT TO USER | |
| ○ | REPORT TO ADMINISTRATOR | |
| ○ | RECORD PROCESS | |
| ○ | UPDATE REGISTERED INFORMATION | |
| ○ | ... | |
| | OK | CANCEL |

| ERROR PROCESS SETTING | | | | | | | | | |
|---|---|---|---|---|---|---|---|---|---|
| OPTIONS (PRINTING PROCESS FOR UNAUTHORIZED USER) | | | | | OPTIONS (ERROR PROCESS) | | | | |
| CONTINUE PRINTING | PREVENT PRINTING | MONOCHROME PRINTING | DUPLEX PRINTING | ... | REPORT TO USER | REPORT TO ADMINISTRATOR | RECORD PROCESS | UPDATE REGISTERED INFORMATION DETAILS | ... |
| ● | ○ | ○ | ○ | ○ | ○ | ○ | ● | ● | ○ |
| | | | | | | | OK | CANCEL | |

| | OPTIONS |
|---|---|
| ● | NUMBER OF USES IS GREATER THAN OR EQUAL TO "N" |
| ● | USAGE PERIOD IS GREATER THAN OR EQUAL TO "N" DAYS |
| ○ | USAGE FREQUENCY IS GREATER THAN OR EQUAL TO "N"% |
| ○ | PRINT-REQUESTING HOST IP ADDRESS RANGE[192.168.XX.X11-X20] |
| ○ | .... |
| ○ | ALWAYS UPDATE |

■ UPDATE CONDITION SETTING

OK    CANCEL

| USER IDENTIFICATION INFORMATION | USER-RELATED INFORMATION ||||| USAGE HISTORY |||||
|---|---|---|---|---|---|---|---|---|---|---|
| LOGGED-ON USER NAME | PRINT-REQUESTING HOST IP ADDRESS | ICON NAME | DRIVER TYPE | ... | ... | USAGE PERIOD || NUMBER OF USES | PRINT-REQUESTING HOST IP ADDRESS | ... |
| ||||||  FIRST | LAST ||||
| User01 | 192.168.XX.XX1 | PRINTER01 | DRIVER01 | ... | ... | 2010/09/01 | 2010/09/30 | 5 | 192.168.XX.XX1 | ... |
| User02 | 192.168.XX.X11 | PRINTER01 | DRIVER02 | ... | ... | 2010/08/01 | 2010/09/15 | 15 | 192.168.XX.X11 | ... |
| User03 | 192.168.XX.11X | PRINTER01 | DRIVER03 | ... | ... | 2010/09/01 | 2010/09/01 | 10 | 192.168.XX.11X | ... |
| ... | ... | ... | ... | ... | ... | ... | ... | ... | ... | ... |

ND STORAGE MEDIUM

IMAGE PROCESSING APPARATUS, UNAUTHORIZED USE PREVENTING METHOD, AND STORAGE MEDIUM

CROSS-REFERENCE TO RELATED APPLICATION

The present application is based upon and claims the benefit of priority of Japanese Patent Application No. 2010-280072, filed on Dec. 16, 2010, the entire contents of which are incorporated herein by reference.

BACKGROUND OF THE INVENTION

1. Field of the Invention

An aspect of this disclosure relates to an image processing apparatus.

2. Description of the Related Art

Some image processing apparatuses have a function for preventing unauthorized use of the image processing apparatuses. For example, Japanese Laid-Open Patent Publication No. 2009-157531 discloses a technology for preventing unauthorized use of an image processing apparatus. In the disclosed technology, information on authorized users is registered beforehand in a management server, the user enters user information when using a printing function of an image processing apparatus, and the image processing apparatus compares the user information with the information registered in the management server to determine whether the user is an authorized user.

However, related-art technologies for preventing unauthorized use tend to increase administrative costs and reduce the convenience of the user.

For example, with the technology disclosed in JP2009-157531, the administrator needs to register information on authorized users beforehand to prevent unauthorized use. This in turn complicates the process for managing authorized users and increases administrative costs. Also with the disclosed technology, the user needs to enter user information to use a function of an image processing apparatus. This in turn increases the number of steps the user needs to perform to use a function of an image processing apparatus and reduces the convenience of the user.

SUMMARY OF THE INVENTION

In an aspect of this disclosure, there is provided an image processing apparatus connected via a data communication channel to an information processing apparatus. The image processing apparatus includes a storing unit configured to store comparison data; an analysis unit configured to analyze a print job sent by a requesting user from the information processing apparatus to obtain user information of the requesting user; a comparison unit configured to compare the obtained user information with the comparison data to determine whether registered user information corresponding to the obtained user information is present in the comparison data; and a registration unit configured to register the obtained user information as the comparison data of an authorized user if the registered user information corresponding to the obtained user information is not present in the comparison data. The comparison unit is configured to control execution of a printing process and/or an error process if the registered user information corresponding to the obtained user information is present in the comparison data.

BRIEF DESCRIPTION OF THE DRAWINGS

FIGS. 4A and 4B are drawings illustrating exemplary screens for setting analysis information according to the first embodiment;

FIG. 5 is a table illustrating exemplary comparison data according to the first embodiment;

FIGS. 8A and 8B are drawings illustrating exemplary screens for setting error process configuration information according to the second embodiment;

FIG. 9 is a drawing illustrating an exemplary screen for setting update conditions according to the second embodiment;

FIG. 10 is a table illustrating exemplary comparison data according to the second embodiment.

DESCRIPTION OF THE PREFERRED EMBODIMENTS

Preferred embodiments of the present invention are described below with reference to the accompanying drawings.

First Embodiment

<System Configuration>

Figure 1:
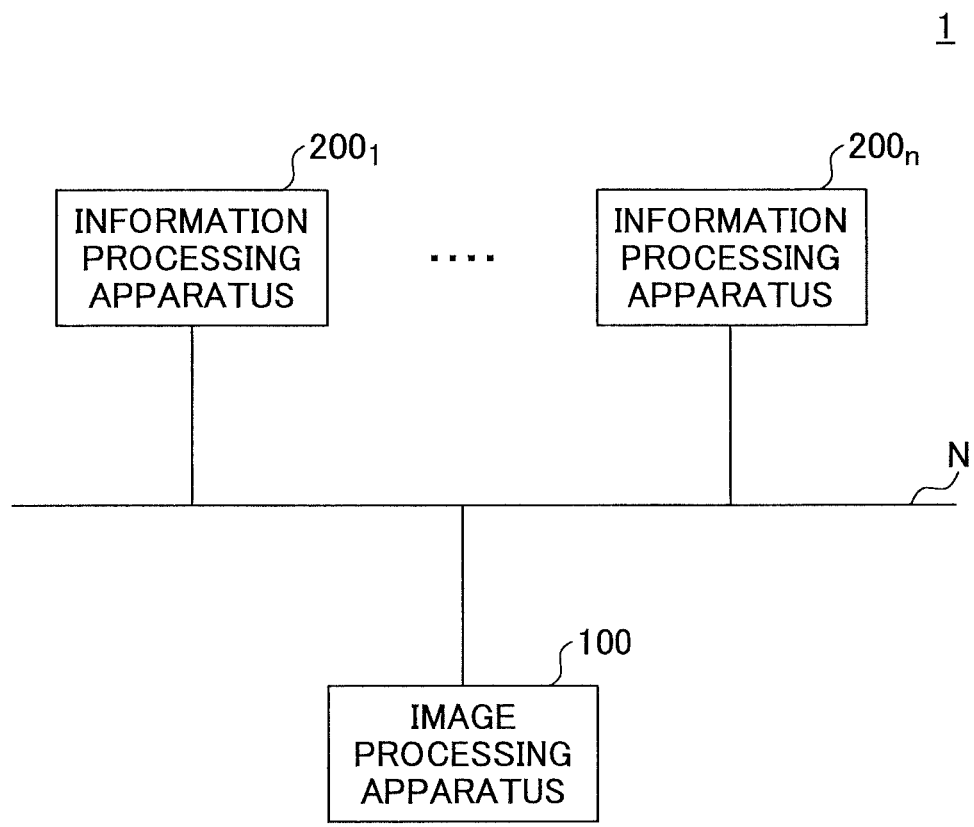
FIG. 1 is a drawing illustrating an exemplary configuration of a printing system according to a first embodiment.

FIG. 1 is a drawing illustrating an exemplary configuration of a printing system 1 according to a first embodiment.

As illustrated in FIG. 1, the printing system 1 includes an image processing apparatus 100 and information processing apparatuses $200_1$-$200_n$ (may be called an information processing apparatus(es) 200 when distinction is not necessary) that are connected via a data communication channel N such as a network (e.g., a local area network (LAN)).

The image processing apparatus 100 is an apparatus including a printing function such as a multifunction peripheral (MFP) or a laser printer. The information processing apparatus 200 sends a print job to the image processing apparatus 100 and requests the image processing apparatus 100 to execute the printing function. The information processing apparatus 200 may be implemented by, for example, a personal computer (PC).

With the above configuration, the printing system 1 can provide a printing service. The printing system 1 may include multiple image processing apparatuses 100 and multiple information processing apparatuses 200.

<Hardware Configuration>

An exemplary hardware configuration of the image processing apparatus 100 is described below.

Figure 2:
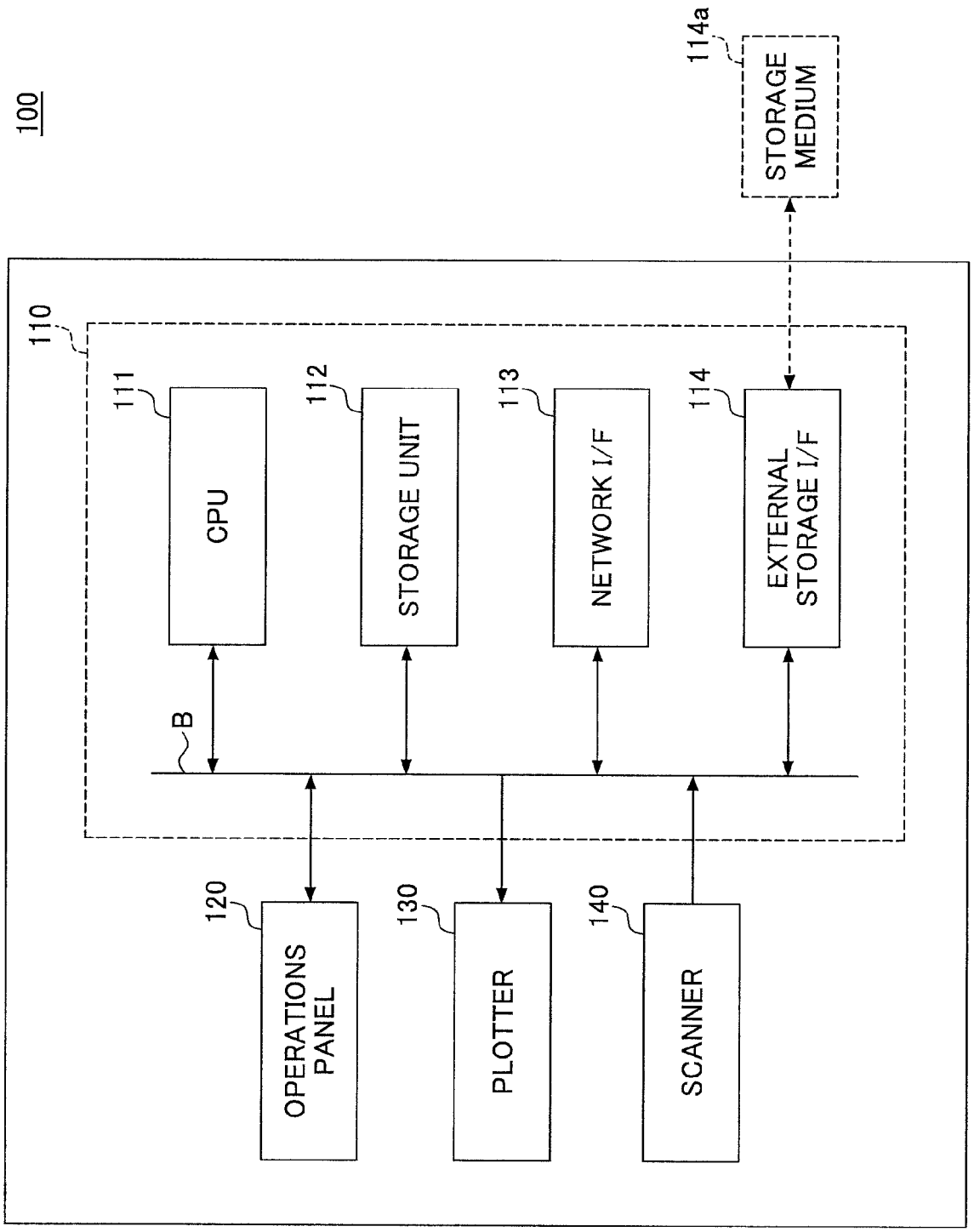
FIG. 2 is a block diagram illustrating an exemplary hardware configuration of an image processing apparatus according to the first embodiment.

FIG. 2 is a block diagram illustrating an exemplary hardware configuration of the image processing apparatus 100 according to the first embodiment.

As illustrated in FIG. 2, the image processing apparatus 100 may include a controller 110, an operations panel 120, a plotter 130, and a scanner 140 that are connected to each other via a bus B.

The operations panel 120 includes a display unit for providing information such as apparatus information to the user and an input unit for receiving user inputs such as settings and instructions. The plotter 130 includes an image forming unit for forming an image on a recording medium (e.g., paper). For example, the plotter 130 forms an image by electrophotography or inkjet printing. The scanner 140 optically scans a document and generates image data.

The controller 110 includes a central processing unit (CPU) 111, a storage unit 112, a network I/F 113, and an external storage I/F 114 that are connected to each other via the bus B.

The CPU 111 executes programs and thereby controls the entire image processing apparatus 100. The storage unit 112 stores programs and data (e.g., image data). The storage unit 112, for example, includes a random access memory (RAM) implemented by a volatile memory, a read only memory (ROM) implemented by a non-volatile memory, and a hard disk drive (HDD) as a mass storage. The RAM is used as a work area (a storage area where programs and data are temporarily stored) by the CPU 111. The ROM and the HDD store the programs and data. The CPU 111 loads the programs from the ROM or the HDD into the RAM and executes the loaded programs.

The network I/F 113 is an interface for connecting the image processing apparatus 100 to a data communication channel N such as a network. The external storage I/F 114 is an interface for connecting a storage medium 114a used as an external storage to the image processing apparatus 100. Examples of the storage medium 114a include a secure digital (SD) memory card, a universal serial bus (USB) memory, a compact disk (CD), and a digital versatile disk (DVD). The image processing apparatus 100 reads programs and data from the storage medium 114a via the external storage I/F 114.

With the above hardware configuration, the image processing apparatus 100 can provide various image processing services (image processing functions) including a printing function.

<Unauthorized Use Preventing Function>

An exemplary unauthorized use preventing function of the image processing apparatus 100 of the first embodiment is described below.

The image processing apparatus 100 analyzes a received print job and thereby obtains user information of a user (hereafter called a requesting user) requesting execution of the print job (or sending the print job). When it is the first time for the requesting user to use the printing function of the image processing apparatus 100, the image processing apparatus 100 stores the obtained user information in a predetermined storage area of a storage unit (e.g., the HDD) and thereby registers the user information as comparison data used to determine whether the user is an authorized user. Meanwhile, when it is not the first time for the requesting user to use the printing function, the image processing apparatus 100 compares the obtained user information with information registered as the comparison data to determine whether the requesting user is an authorized user (authorized use of the printing function). Based on the determination result, the image processing apparatus 100 controls execution of a printing process (a normal process performed when the requesting user is an authorized user) and an error process (performed when the requesting user is an unauthorized user). The image processing apparatus 100 of the first embodiment includes an unauthorized use preventing function as described above.

With related-art methods, the administrator needs to register information on authorized users beforehand. This in turn complicates the process for managing authorized users and increases administrative costs. Also with the related-art methods, the user needs to enter user information to use a function of an image processing apparatus. This in turn increases the number of steps the user needs to perform to use a function of an image processing apparatus and reduces the convenience of the user.

To prevent such problems, the image processing apparatus 100 of the first embodiment is configured to obtain user information from a print job received from a user, to register the obtained user information as comparison data if it is the first time for the user to use the printing function, and when the same user requests the printing function at a later time, to compare the user information of the user obtained from a print job with user information registered as the comparison data to determine whether the user is an authorized user.

This configuration eliminates the need for the administrator to manage authorized users and enables the user to use functions of the image processing apparatus 100 with a simple operation. This in turn makes it possible to prevent unauthorized use of functions of the image processing apparatus 100 without increasing administrative costs and without reducing the convenience of the user.

An exemplary functional configuration of the image processing apparatus 100 is described below.

Figure 3:
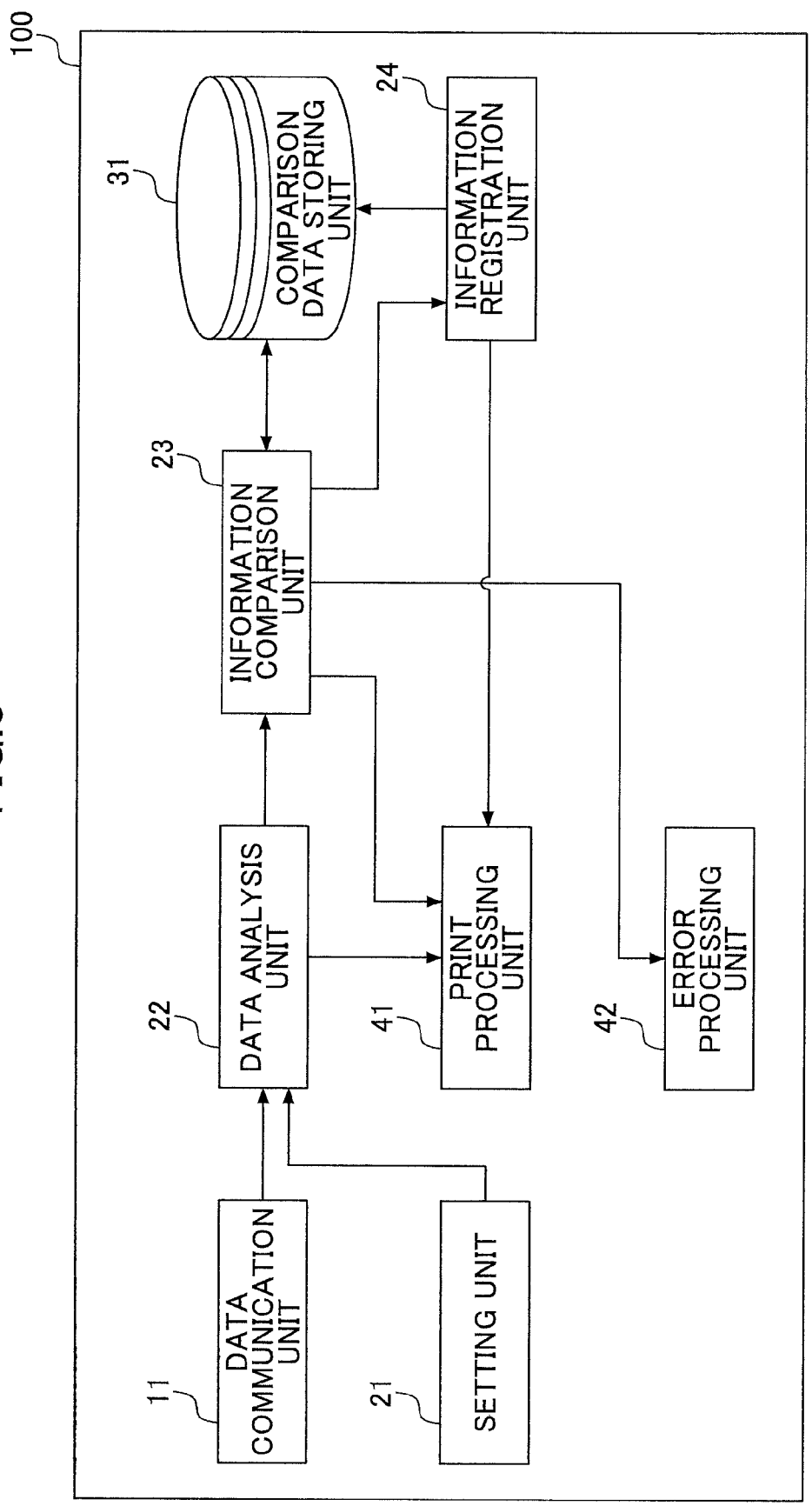
FIG. 3 is a block diagram illustrating an exemplary functional configuration of an image processing apparatus according to the first embodiment.

FIG. 3 is a block diagram illustrating an exemplary functional configuration of the image processing apparatus 100 according to the first embodiment.

As illustrated in FIG. 3, the image processing apparatus 100 may include a data communication unit 11, a setting unit 21, a data analysis unit 22, an information comparison unit 23, an information registration unit 24, a comparison data storing unit 31, a print processing unit 41, and an error processing unit 42.

The data communication unit 11 is a functional unit that performs data communications with the information processing apparatus 200. For example, the data communication unit 11 receives a print job sent from the information processing apparatus 200 and sends information such as an unauthorized use determination result and/or a printing result to the information processing apparatus 200.

The setting unit 21 is a functional unit for setting information items (hereafter called analysis information) to be obtained by analyzing a print job. For example, the setting unit 21 provides graphical user interfaces (GUIs) as illustrated in FIGS. 4A and 4B that are used to receive settings from the administrator.

FIGS. 4A and 4B are drawings illustrating exemplary screens for setting analysis information according to the first embodiment.

FIG. 4A illustrates a setting screen W1 for setting user identification information to be obtained as the analysis information. FIG. 4B illustrates a setting screen W2 for setting user related information to be obtained as the analysis information.

The setting screen W1 includes options such as "logged-on user name", "user ID", "print-requesting host name", and "print-requesting host internet protocol (IP) address" as candidates of the user identification information to be obtained. In the example of FIG. 4A, "logged-on user name" indicating the name of a user who has logged onto the information processing apparatus 200 is selected as the user identification information to be obtained. The setting screen W2 includes options such as "icon name", "print-requesting host IP address", "print-requesting host media access control (MAC) address", and "driver type" as candidates of the user related information to be obtained. In the example of FIG. 4B, "icon name" indicating the icon name of a printer driver (print data conversion program) of the image processing apparatus 200 that has generated a print job, "print-requesting host IP address" indicating a network setting (or address) assigned to the information processing apparatus 200 that has sent the print job, and "driver type" indicating the type of the printer driver are selected as the user related information to be obtained.

The administrator can set user information (user identification information and user related information) used in an unauthorized use preventing process beforehand via the setting screens W1 and W2.

Referring back to FIG. 3, the setting unit 21 receives settings for the user identification information and the user related information via the setting screens W1 and W2 as the settings for analysis information to be obtained by analyzing a print job. The setting unit 21 sends the received settings to the data analysis unit 22. The data analysis unit 22 determines information items (analysis information) to be obtained by analyzing a print job based on the settings received from the setting unit 21.

The data analysis unit 22 is a functional unit that analyzes a received print job. A print job includes header data that are definition data such as user information and printing condition information, and print data including draw commands executed in the printing process and image data. The header data are represented by, for example, printer job language (PJL) data, and the print data are represented by, for example, page description language (PDL) data. Basically, the data analysis unit 22 analyzes the header data.

The data analysis unit 22 analyzes the header data of the print job according to the settings received from the setting unit 21 and thereby obtains analysis information. More specifically, the data analysis unit 22 analyzes the header data and thereby extracts definition data such as the user identification information and the user related information that are specified as the analysis information via the setting unit 21. The data analysis unit 22 sends the obtained analysis information to the information comparison unit 23.

The information comparison unit 23 is a functional unit that compares the analysis information (i.e., obtained user information) with user information registered as the comparison data. For example, the information comparison unit 23 compares the analysis information with the user information registered as the comparison data as described below.

The information comparison unit 23 accesses the comparison data storing unit 31 and determines, based on the user identification information in the analysis information, whether a user (hereafter called a requesting user) requesting execution of a print job is a registered user registered in the comparison data. If the user identification information of the requesting user is not present in the comparison data, the information comparison unit 23 determines that the requesting user is a new user using the printing function for the first time. Meanwhile, if the user identification information of the requesting user is present in the comparison data, the information comparison unit 23 determines that the requesting user is an authorized user who has previously used the printing function. Thus, the information comparison unit 23 first determines whether the requesting user is a new user of the printing function.

When it is determined that the requesting user is a new user of the printing function, the information comparison unit 23 sends the analysis information to the information registration unit 24 and requests the information registration unit 24 to register the analysis information as the comparison data.

The information registration unit 24 is a functional unit that registers the analysis information as comparison data 31D in the comparison data storing unit 31. The information registration unit 24 accesses the comparison data storing unit 31 and performs data processing on the comparison data 31D according to a received request. The comparison data storing unit 31 is, for example, implemented by a storage area of a storage unit (e.g., the HDD) of the image processing apparatus 100.

Details of the comparison data 31D stored in the comparison data storing unit 31 are described below.

FIG. 5 is a table illustrating an exemplary configuration of the comparison data 31D according to the first embodiment.

As illustrated in FIG. 5, the comparison data 31D include records for respective users (registered users). Each record includes a user identification information field and a user related information field that are associated with each other.

The user identification information field stores user identification information such as a logged-on user name (e.g., UserXX). The user related information field stores user related information items such as a print-requesting host IP address (e.g., 192.168.XX.XXX), an icon name (e.g., PRINTERXX), and a driver type (e.g., DRIVERXX).

Thus, the comparison data 31D include information items (analysis information) set by the setting unit 21. The administrator can configure the information items constituting the comparison data 31D by setting user information to be obtained as analysis information using the setting unit 21.

Referring back to FIG. 3, according to a data registration request, the information registration unit stores the user identification information and the user related information obtained as the analysis information in association with each other in a predetermined storage area(s) and thereby registers the user identification information and the user related information as the comparison data 31D. After registering the analysis information of the requesting user, the information registration unit 24 requests the print processing unit 41 to execute the print job requested by the requesting user.

Thus, in the image processing apparatus 100 of the first embodiment, when a user requesting execution of a print job is a new user of the printing function, analysis information obtained from the print job is automatically registered as the comparison data 31D and is used next time to determine whether the user is an authorized user. With this configuration, the administrator needs to set only information items (user information) used for the unauthorized use preventing process before executing the unauthorized use preventing function and does not need to register information on authorized users beforehand. This in turn eliminates the need for the administrator to perform a complicated process of managing authorized users.

Meanwhile, if the information comparison unit 23 determines that the requesting user is not a new user of the printing function, it indicates that user information of the requesting user is not present in the comparison data 31D. Therefore, in this case, the information comparison unit 23 identifies user related information (registered user related information) of the requesting user in the comparison data 31D based on the user identification information in the analysis information. The information comparison unit 23 compares the user related information (obtained user related information) in the analysis information with the registered user related information. Based on the comparison result, the information comparison unit 23 determines whether the requesting user is an authorized user. If the obtained user related information matches the registered user related information, the information comparison unit 23 determines that the requesting user is an authorized user (i.e., detects authorized use of the printing function). Meanwhile, if the obtained user related information does not match the registered user related information, the information comparison unit 23 determines that the requesting user is an unauthorized user (i.e., detects unauthorized use of the printing function). Based on the determination result (unauthorized use determination result), the information comparison unit 23 requests the print processing unit 41 and/or the error processing unit 42 to perform the corresponding processing. Thus, the information comparison unit 23 controls execution of the printing process and the error process based on the comparison result.

As described above, in the image processing apparatus 100 of the first embodiment, analysis information obtained from a received print job is automatically compared with user information registered as the comparison data 31D. This configuration eliminates the need for the user to enter user information to use functions of the image processing apparatus 100 and thereby enables the user to use functions of the image processing apparatus 100 with a simple operation.

In the above descriptions, it is assumed that user related information including multiple information items is used to determine whether a user is an authorized user (i.e., to detect unauthorized use). In this case, there may be, for example, two methods for determining whether a user is an authorized user.

In one method, if at least one of the information items in the obtained user related information does not match the corresponding information item in the registered user related information (AND operation), the requesting user is determined to be an unauthorized user (i.e., unauthorized use of the printing function is detected). In another method, if at least one of the information items in the obtained user related information matches the corresponding information item in the registered user related information (OR operation), the requesting user is determined to be an authorized user (i.e., authorized use of the printing function is detected). The method for determining whether a user is an authorized user may also be set via the setting unit 21 when setting the analysis information.

The print processing unit 41 is a functional unit that executes a received print job. The print processing unit 41 may be implemented by, for example, a PDL parser (a print data processing program). From the print data in the received print job, the print processing unit 41 generates data (e.g., raster image data or bitmap data) that the plotter 130 of the image processing apparatus 100 can process. The plotter 130 receives the generated data from the print processing unit 41 and forms an image according to the generated data.

The error processing unit 42 is a functional unit that performs an error process when unauthorized use is detected. For example, the error processing unit 42 reports to the information processing apparatus 200 sending the print job that unauthorized use has been detected. More specifically, the error processing unit 42 sends a message indicating unauthorized use to the information processing apparatus 200 based on the print-requesting host IP address in the obtained user related information of the requesting user who has been determined to be an unauthorized user.

Thus, the unauthorized use preventing function of the first embodiment is provided through collaboration of the above described functional units of the image processing apparatus 100. The functional units are implemented by executing programs (software for implementing the unauthorized use preventing function) installed in the image processing apparatus 100. For example, the programs are loaded by a processing unit (e.g., the CPU 111) from storage units (e.g., the ROM or the HDD) into a memory (e.g., the RAM) and are executed to implement the functional units of the image processing apparatus 100.

An exemplary process performed by the functional units of the image processing apparatus 100 of the first embodiment (collaboration among the functional units) is described below.

<Unauthorized Use Preventing Process>

Figure 6:
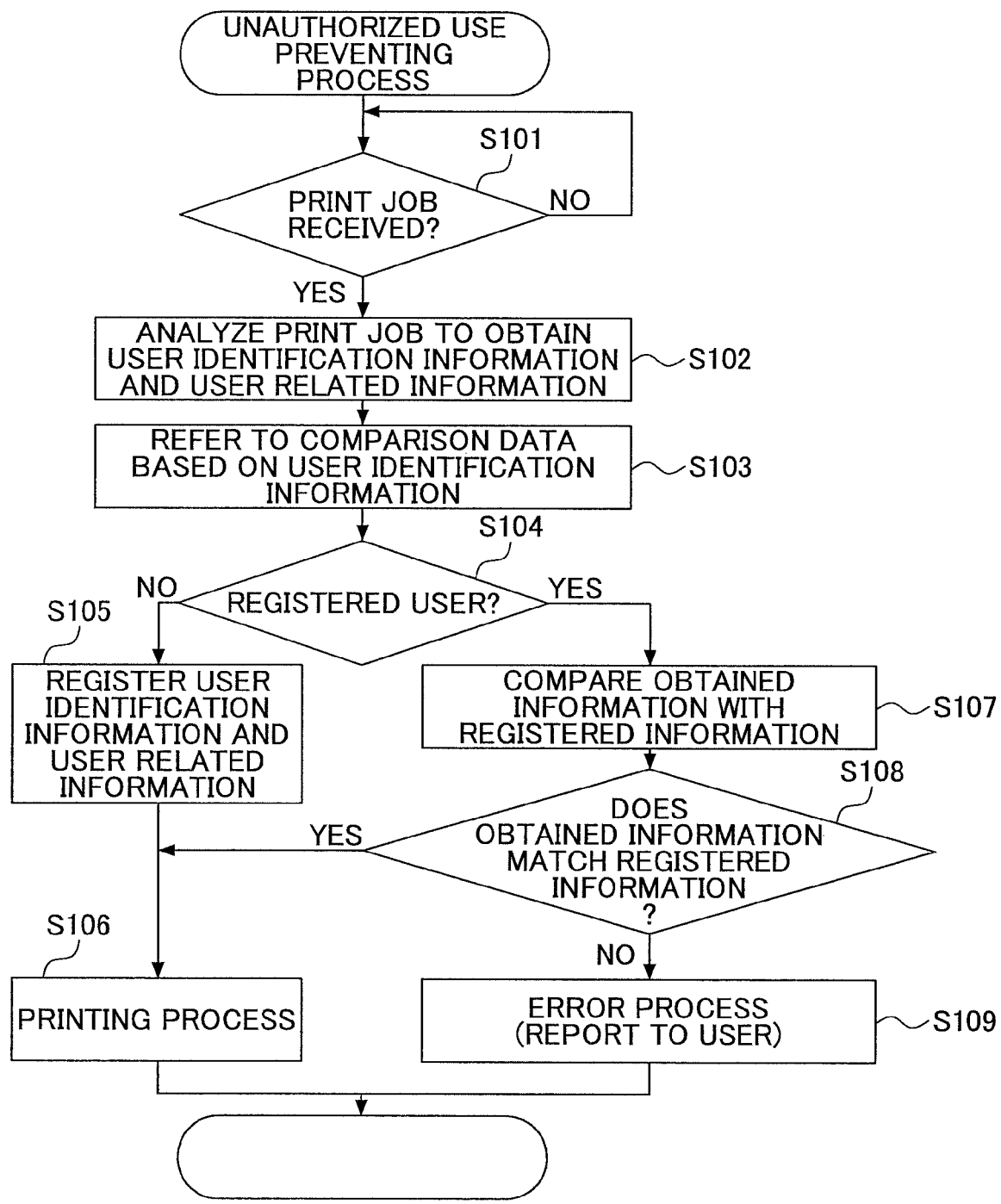
FIG. 6 is a flowchart illustrating an exemplary process for preventing unauthorized use according to the first embodiment.

FIG. 6 is a flowchart illustrating an exemplary process for preventing unauthorized use according to the first embodiment. In FIG. 6, it is assumed that the user identification information and the user related information are set as analysis information by the administrator using the setting unit 21.

As illustrated in FIG. 6, when the data communication unit 11 of the image processing apparatus 100 receives a print job from the information processing apparatus 200 (YES in step S101), the data analysis unit 22 analyzes the received print job (step S102). In this step, the data analysis unit 22 analyzes the header data (definition data) in the print job and obtains the user identification information and the user related information from the header data according to the settings received from the setting unit 21. The data analysis unit 22 sends the user identification information and the user related information, i.e., the analysis results, to the information comparison unit 23.

The information comparison unit 23 accesses the comparison data storing unit 31 to refer to the comparison data 31D (step S103). More specifically, the information comparison unit 23 refers to the comparison data 31D based on the user identification information obtained by the data analysis unit 22.

The information comparison unit 23 determines whether the user identification information is present in the comparison data 31D and thereby determines whether the requesting user is a registered user (step S104).

If the information comparison unit 23 determines that the requesting user is not a registered user (i.e., a new user) (NO in step S104), the information registration unit 24 registers the user identification information and the user related information obtained by the data analysis unit 22 as the comparison data 31D for the requesting user (step S105). More specifically, the information registration unit 24 accesses the comparison data storing unit 31 and stores the user identification information and the user related information in association with each other in a predetermined storage area(s) to register them as the comparison data 31D. Then, the information registration unit 24 requests the print processing unit 41 to execute the print job requested by the requesting user. In response, the print processing unit 41 executes the print job received from the data analysis unit 22 to perform a printing process (step S106).

Meanwhile, if the information comparison unit 23 determines that the requesting user is a registered user (i.e., not a new user) (YES in step S104), the information comparison unit 23 compares the user related information (obtained user related information) obtained by the data analysis unit 22 with the corresponding user related information (registered user related information) registered as the comparison data 31D (step S107). The information comparison unit 23 compares the obtained user related information with the registered user related information registered as the comparison data 31D in association with the corresponding user identification information to determine whether the requesting user is an authorized user (i.e., whether the print job is requested by an authorized user) (step S108).

If the obtained user related information matches the registered user related information (YES in step S108), the information comparison unit 23 determines that the requesting user is an authorized user (i.e., detects authorized use of the printing function) and requests the print processing unit 41 to execute the print job requested by the requesting user. In response, the print processing unit 41 executes the print job received from the data analysis unit 22 to perform a printing process (step S106).

Meanwhile, if the obtained user related information does not match the registered user related information (NO in step S108), the information comparison unit 23 determines that the requesting user is an unauthorized user (i.e., detects unauthorized use of the printing function) and requests the error processing unit 42 to perform an error process. In the error process, the error processing unit 42, for example, sends a message indicating unauthorized use to the requesting user (step S109).

SUMMARY

As described above, in the image processing apparatus 100 of the first embodiment, the data analysis unit 22 analyzes a print job received by the data communication unit 11 to obtain user information of the requesting user. Based on the obtained user information, the information comparison unit 23 determines whether the requesting user is a registered user. If the information comparison unit 23 determines that the requesting user is not a registered user (i.e., a new user), the information registration unit 24 stores the obtained user information in the comparison data storing unit 31 and thereby registers the user information as the comparison data 31D of an authorized user. Meanwhile, if it is determined that the requesting user is a registered user, the information comparison unit 23 compares the obtained user information with user information registered as the comparison data 31D to determine whether the requesting user is an authorized user (whether it is authorized use of the printing function). The image processing apparatus 100 controls execution of the printing process performed by the print processing unit 41 and the error process performed by the error processing unit 42 based on the comparison result of the information comparison unit 23.

This configuration eliminates the need for the administrator to perform a complicated process of managing authorized users and enables the user to use functions of the image processing apparatus 100 with a simple operation. This in turn makes it possible to prevent unauthorized use of functions of the image processing apparatus 100 without increasing administrative costs and without reducing the convenience of the user.

Second Embodiment

To strictly prevent unauthorized use, it is preferable to determine whether to execute a print job based on whether the requesting user is an authorized user as described in the first embodiment.

However, in practice, a certain degree of flexibility is desired in using the unauthorized use preventing function depending on the environment where the image processing apparatus 100 is installed. For example, the administrator may desire to use the unauthorized use preventing function at such a level that the unauthorized use preventing function does not reduce the convenience of the users who use the printing function. In such a case, instead of simply preventing execution of a printing process requested by an unauthorized user and reporting the detection of unauthorized use to the unauthorized user, it is preferable, for example, to continue (or execute) the printing process requested by the unauthorized user while recording the printing process.

Also, the user may change information processing apparatuses used to print a document. To deal with such a case, the unauthorized use preventing function is preferably configured to automatically update user information of a user registered as the comparison data 31D if the user is determined to be an unauthorized user due to a changed information processing apparatus and if certain conditions are met.

For the above reasons, an image processing apparatus of a second embodiment is configured to allow the administrator (or any other type of user) to set details of a printing process and/or an error process performed when a user is determined to be an unauthorized user and to set update conditions used to determine whether to update user information registered as the comparison data 31D.

This configuration makes it possible to use the unauthorized use preventing function without increasing the administrative costs and without reducing the convenience of the user.

Below, the same reference numbers as those used in the first embodiment are assigned to the corresponding components of the image processing apparatus 100, and configurations and operations of the image processing apparatus 100 that are different from the first embodiment are mainly described.

<Unauthorized Use Preventing Function>

Figure 7:
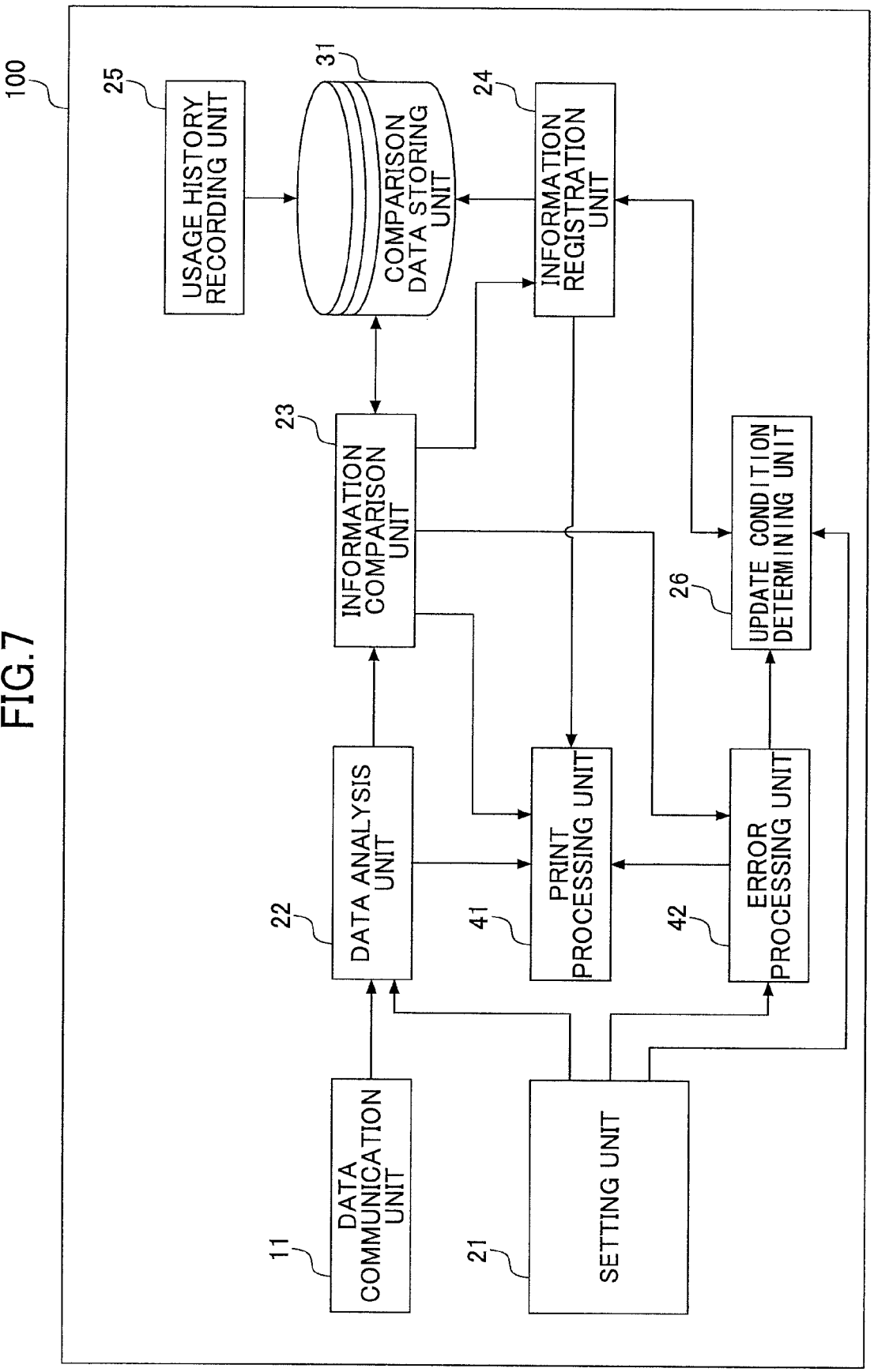
FIG. 7 is a block diagram illustrating an exemplary functional configuration of an image processing apparatus according to a second embodiment.

FIG. 7 is a block diagram illustrating an exemplary functional configuration of the image processing apparatus 100 according to the second embodiment.

Unlike the first embodiment, the image processing apparatus 100 of the second embodiment additionally includes a usage history recording unit 25 that records the history of usage of the printing function by users and an update condition determining unit 26 that determines whether update conditions are satisfied and thereby determines whether to update user information registered as the comparison data 31D. The second embodiment is also different from the first embodiment in that the setting unit 21 is configured to send control information to the error processing unit 42 and to the update condition determining unit 26, in addition to the data analysis unit 22.

For example, the setting unit 21 provides graphical user interfaces (GUIs) as illustrated in FIGS. 8A, 8B, and 9 that are used to receive settings from the administrator.

FIGS. 8A and 8B illustrate exemplary setting screens W31 and W32 for setting error process configuration information indicating details of the error process according to the second embodiment.

The setting screen W31 includes options "report to user", "report to administrator", "record process", and "update registered information" that are candidates of actions to be taken in the error process that is performed when the user is determined to be an unauthorized user. In the example of FIG. 8A, "report to user" is selected. In this case, detection of unauthorized use is reported to the requesting user in the error process. The setting screen W32 includes options "continue printing", "prevent printing", "monochrome printing", and "duplex printing" that are candidates of actions to be taken in the printing process that is performed when the user is determined to be an unauthorized user. The setting screen W32 also includes options "report to user", "report to administrator", "record process", and "update registered information" that are candidates of actions to be taken in the error process that is performed when the user is determined to be an unauthorized user. In the example of FIG. 8B, "continue printing", "record process", and "update registered information" are selected. In this case, when the user is determined to be an unauthorized user, a printing process is performed, the printing process is recorded, and the user information registered as the comparison data 31D is updated if certain conditions are satisfied.

Thus, in the second embodiment, multiple variations of error processes are provided. The setting screen W31 does not include options for specifying a printing process to be performed when the user is determined to be an unauthorized user. Therefore, the setting screen W31 may be used when the administrator desires to strictly prevent unauthorized use. Meanwhile, the setting screen W32 includes options for specifying both a printing process and an error process to be performed when the user is determined to be an unauthorized user. Therefore, the setting screen W32 may be used when the administrator desires to use the unauthorized use preventing function with a certain degree of flexibility.

With the setting screen W31 or W32, the administrator can set details of a printing process and/or an error process performed when the user is determined to be an unauthorized user according to the operational policy of the image forming apparatus 100 (or the unauthorized use preventing function).

FIG. 9 illustrates an exemplary setting screen W4 for setting update conditions used to determine whether to update user information registered as the comparison data 31D according to the second embodiment.

The setting screen W4 is displayed, for example, when the option "update registered information" is selected and a "Details" button is pressed on the setting screen W32.

The setting screen W4 includes update conditions such as "number of uses is greater than or equal to N", "usage period is greater than or equal to N days", "usage frequency is greater than or equal to N %", "print-requesting host IP address range", and "always update". In the example of FIG. 9, "number of uses is greater than or equal to N" and "usage period is greater than or equal to N days" are selected. In this case, if the user has used the printing function N times or more, or the user has used the printing function for N days or more, the user information of the user registered as the comparison data 31D is updated based on the analysis information even if the user is determined to be an unauthorized user.

With the setting screen W4, the administrator can set update conditions for determining whether to update user information registered as the comparison data 31D according to the operational policy of the image forming apparatus 100 (or the unauthorized use preventing function).

As illustrated in FIGS. 8A, 8B, and 9, it is possible to select multiple options on each of the setting screens W31, W32, and W4. Accordingly, the administrator can set various combinations of actions and update conditions for the unauthorized use preventing function. However, some options are mutually exclusive. For example, among the options for the printing process to be performed when the user is determined to be an unauthorized user, "continue printing" and "prevent printing" are mutually exclusive and cannot be selected simultaneously.

Referring back to FIG. 7, the setting unit 21 receives settings for the printing process and/or the error process and an update condition(s) for the user information registered as the comparison data 31D via the setting screens W31/W32 and W4 as control settings for processes to be performed when the user is determined to be an unauthorized user. The setting unit 21 sends the received control settings to the error processing unit 42 and/or the update condition determining unit 26. More specifically, the setting unit 21 sends the settings for the printing process and/or the error process as control information to the error processing unit 42. Meanwhile, the setting unit 21 sends the update condition for the user information registered as the comparison data 31D as control information to the update condition determining unit 26. As a result, the control information for the printing process and/or the error process is set in the error processing unit 42. Also, the update condition for the user information registered as the comparison data 31D is set in the update condition determining unit 26.

When the information comparison unit 23 determines that the requesting user is an unauthorized user, the error processing unit 42 performs the error process according to the settings received from the setting unit 21. Also, when the setting "continue printing" is received from the setting unit 21, the error processing unit 42 requests the print processing unit 41 to perform the printing process.

Further, when the setting "update registered information" is received from the setting unit 21, the error processing unit 42 sends the user identification information of the requesting user to the update condition determining unit 26 and requests the update condition determining unit 26 to determine whether the update condition is satisfied, i.e., to determine whether to update the user information registered as the comparison data 31D.

An exemplary configuration of the comparison data 31D according to the second embodiment is described below.

FIG. 10 is a table illustrating an exemplary configuration of the comparison data 31D according to the second embodiment.

As illustrated in FIG. 10, the comparison data 31D include records for respective users (registered users). Each record includes a user identification information field, a user related information field, and a usage history information field that are associated with each other.

The usage history information field stores information items (usage history information) related to the usage history of the printing function. For example, the usage history information includes a usage period indicating the number of days for which the user has used the printing function, a number of uses indicating the number of times the user has used the printing function, and a network setting (e.g., an IP address) of the information processing apparatus 200 that has sent the print job. The usage period is represented by a first used date when the user used the printing function first time and a last used date when the user used the printing function last time.

Thus, the usage history field stores information items that are used to determine whether to update the user information registered as the comparison data 31D (or to determine whether the update condition(s) is satisfied). The usage history information is recorded by the usage history recording unit 25. For example, the usage history recording unit 25 records the first and last used dates based on information obtained from the internal clock of the image processing apparatus 100. Also, the usage history recording unit 25 records the number of uses based on, for example, information obtained from the print processing unit 41.

Referring back to FIG. 7, an update condition determining process performed by the update condition determining unit 26 is described below.

In the descriptions below, the comparison data 31D as illustrated in FIG. 10 are used.

As an example, let us assume that User01 has switched from the information processing apparatus 200 with an IP address "192.168.XX.XX1" to the information processing apparatus 200 with an IP address "192.168.XX.XX2". In this case, the print-requesting host IP address in the user related information obtained from a print job sent by User01 differs from the print-requesting host IP address in the corresponding user related information registered as the comparison data 31D. Therefore, the information comparison unit 23 determines that User01 is not an authorized user.

As another example, if an unauthorized user impersonating User01 (authorized user) sends a print job before User01, the user information of the unauthorized user is obtained from the print job and registered as the comparison data 31D. In this case, when User01 sends a print job at a later time, the user related information obtained from the print job sent by User01 differs from the corresponding user related information registered as the comparison data 31D. Therefore, the information comparison unit 23 determines that User01 is not an authorized user.

Thus, in the above cases, User01 who is an authorized user is determined to be an unauthorized user.

In related-art methods, to prevent this problem, the administrator updates the user information registered as the comparison data 31D according to changes in the user environment. However, this complicates the management process and increases the workload of the administrator.

For this reason, in the second embodiment, when an authorized user is determined to be an unauthorized user due to a change in the user environment or use of the printing function by an unauthorized (impersonating) user, the corresponding user information registered as the comparison data 31D is automatically updated if the update condition is satisfied.

The update condition determining unit 26 performs an update condition determining process as described below.

Here, the update condition determining unit 26 is configured to record usage history information of requesting users who are determined to be unauthorized users and temporarily store the recorded usage history information in association with the user identification information in a storage area that is different from the storage area where the comparison data 31D are stored. The update condition determining unit 26 refers to the temporarily stored usage history information based on the user identification information of the requesting user. Based on the temporarily stored usage history information, the update condition determining unit 26 determines whether the update condition received from the setting unit 21 is satisfied. If the update condition is satisfied, the update condition determining unit 26 requests the information registration unit 24 to update the user information registered as the comparison data 31D based on analysis information (user information of the requesting user) obtained by analyzing the print job sent by the requesting user.

For example, when the update condition "number of uses is greater than or equal to N" is set, the update condition determining unit 26 determines whether the number of uses recorded in the temporarily stored usage history information is greater than or equal to a threshold N. As another example, when the update condition "usage period is greater than or equal to N days" is set, the update condition determining unit 26 determines whether the usage period (the number of days from the first used date to the last used date) recorded in the temporarily stored usage history information is greater than or equal to a threshold N. If the number of uses or the usage period is greater than or equal to the threshold N, the update condition determining unit 26 requests the information registration unit 24 to update the corresponding user information registered as the comparison data 31D based on the analysis information obtained from the print job sent by the requesting user.

As another example, when the update condition "print-requesting host IP address range" is set, the update condition determining unit 26 determines whether the IP address recorded in the temporarily stored usage history information is within a predetermined address range "192.168.XX.X11-X20". If the IP address is within the predetermined address range, the update condition determining unit 26 requests the information registration unit 24 to update the corresponding user information registered as the comparison data 31D based on the analysis information obtained from the print job sent by the requesting user.

As still another example, when the update condition "usage frequency is greater than or equal to N %" is set, the update condition determining unit 26 totals the number of uses (a first number of uses) recorded in the usage history information in the comparison data 31D and the number of uses (a second number of uses) recorded in the temporarily stored usage history information, and divides the second number of uses by the total number to calculate the usage frequency. In other words, the update condition determining unit 26 totals the number of uses (the first number of uses) by a user when the user is determined to be an authorized user and the number of uses (the second number of uses) by the same user when the user is determined to be an unauthorized user, and calculates the percentage of the second number of uses (by the "unauthorized" user) in the total number as the usage frequency. The update condition determining unit 26 determines whether the calculated usage frequency is greater than N %. If the usage frequency is greater than or equal to N %, the update condition determining unit 26 requests the information registration unit 24 to update the corresponding user information registered as the comparison data 31D based on the analysis information obtained from the print job sent by the requesting user.

Thus, with the image processing apparatus 100 of the second embodiment, it is possible to set details of the printing process and/or the error process to be performed when the requesting user is determined to be an unauthorized user according to the preference of the administrator. This configuration makes it possible to use the unauthorized use preventing function without reducing the convenience of the user. Also with the image processing apparatus 100 of the second embodiment, it is possible to set an update condition(s) and to automatically update user information registered as the comparison data 31D when the update condition is satisfied. This configuration makes it possible to use the unauthorized use preventing function without complicating the administrative work performed by the administrator.

As described above, the unauthorized use preventing function of the second embodiment is provided through collaboration of the functional units of the image processing apparatus 100.

An exemplary process performed by the functional units of the image processing apparatus 100 of the second embodiment (collaboration among the functional units) is described below.

<Unauthorized Use Preventing Process>

Figure 11:
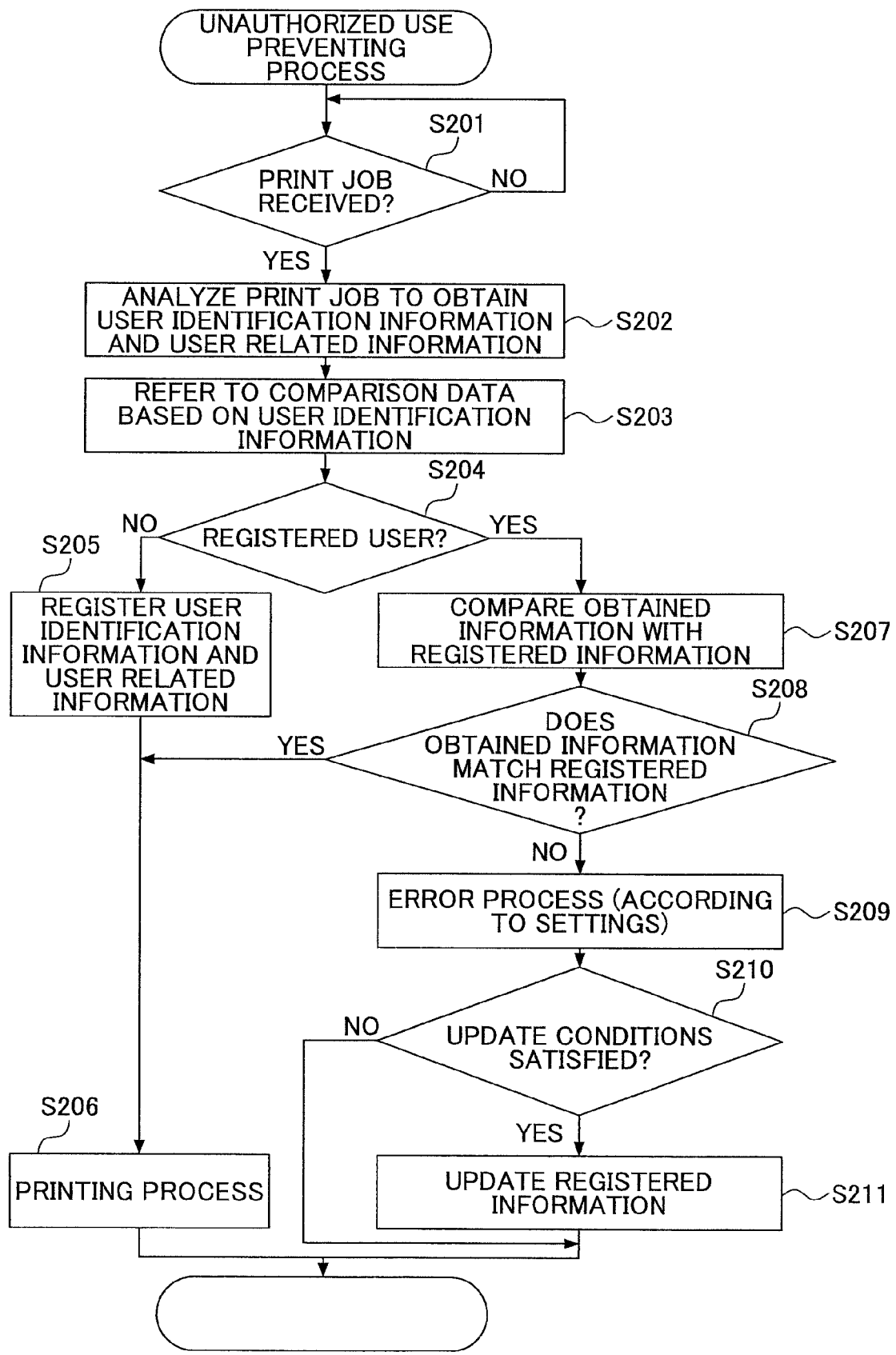
FIG. 11 is a flowchart illustrating an exemplary process for preventing unauthorized use according to the second embodiment.

FIG. 11 is a flowchart illustrating an exemplary process for preventing unauthorized use according to the first embodiment. In FIG. 11, it is assumed that the option "continue printing" for the printing process and the options "record process" and "update registered information" for the error process are set as control information by the administrator using the setting unit 21. It is also assumed that the update condition "number of uses is greater than or equal to N" is set as control information by the administrator using the setting unit 21.

The process illustrated in FIG. 11 is different from the process illustrated in FIG. 6 in steps S207 through S211. Therefore, descriptions of steps S201 through S206 in FIG. 11 are omitted here.

As illustrated in FIG. 11, if the information comparison unit 23 determines that the requesting user is a registered user (i.e., not a new user) (YES in step S204), the information comparison unit 23 compares the user related information (obtained user related information) obtained by the data analysis unit 22 with the corresponding user related information (registered user related information) registered as the comparison data 31D (step S207). The information comparison unit 23 compares the obtained user related information with the registered user related information registered as the comparison data 31D in association with the corresponding user identification information to determine whether the requesting user is an authorized user (i.e., whether the print job is requested by an authorized user) (step S208).

If the obtained user related information does not match the registered user related information (NO in step S208), the information comparison unit 23 determines that the requesting user is an unauthorized user (i.e., detects unauthorized use of printing function) and requests the error processing unit 42 to perform an error process. Then, the error processing unit 42 performs an error process according to the settings received from the setting unit 21 (step S209).

In this exemplary process, as described above, it is assumed that "continue printing" is selected as an option for the printing process performed when the unauthorized use is detected. Therefore, the error processing unit 42 requests the print processing unit 41 to perform a printing process. Thus, in this case, the print processing unit 41 executes the print job received from the data analysis unit 22 to perform the printing process even when the unauthorized use is detected.

Also in this exemplary process, it is assumed that "record process" is selected as an option for the error process. Therefore, the error processing unit 42 requests the usage history recording unit 25 to record the printing process (usage history of the printing function) for the print job requested by the requesting user determined to be an unauthorized user. In response, the usage history recording unit 25 records the printing process performed by the print processing unit 41.

Also, the error processing unit 42 sends the user identification information of the requesting user to the update condition determining unit 26 and requests the update condition determining unit 26 to determine whether an update condition received from the setting unit 21 is satisfied. In response, the update condition determining unit 26 determines whether the update condition is satisfied (step S210).

Here, the update condition determining unit 26 is configured to record usage history information of requesting users who are determined to be unauthorized users and temporarily store the recorded usage history information in association with the user identification information in a storage area. The update condition determining unit 26 refers to the temporarily stored usage history information based on the user identification information of the requesting user. Based on the temporarily stored usage history information, the update condition determining unit 26 determines whether the number of uses recorded in the temporarily stored usage history information is greater than or equal to a threshold N. If the number of uses is greater than or equal to the threshold N, the update condition determining unit 26 determines that the update condition is satisfied.

If the update condition is satisfied (YES in step S210), the update condition determining unit 26 requests the information registration unit 24 to update the user information registered as the comparison data 31D based on the analysis information obtained by analyzing the print job sent by the requesting user. In response, the information registration unit 24 updates the user information registered as the comparison data 31D based on the analysis information (step S211). For example, the information registration unit 24 overwrites the user information registered as the comparison data 31D with the analysis information.

Meanwhile, if the update condition is not satisfied (NO in step S210), the update condition determining unit 26 does not request the information registration unit 24 to update the user information registered as the comparison data 31D.

SUMMARY

As described above, in the image processing apparatus 100 of the second embodiment, the data analysis unit 21 analyzes a print job received by the data communication unit 11 to obtain user information of the requesting user. Based on the obtained user information, the information comparison unit 23 determines whether the requesting user is a registered user. If the information comparison unit 23 determines that the requesting user is not a registered user (i.e., a new user), the information registration unit 24 stores the obtained user information in the comparison data storing unit 31 and thereby registers the user information as the comparison data 31D of an authorized user which are used to detect unauthorized use. Meanwhile, if it is determined that the requesting user is a registered user, the information comparison unit 23 compares the obtained user information with user information registered as the comparison data 31D to determine whether the requesting user is an authorized user (whether it is authorized use of the printing function). The image processing apparatus 100 controls execution of the printing process performed by the print processing unit 41 and the error process performed by the error processing unit 42 based on the comparison result of the information comparison unit 23.

If the requesting user is determined to be an unauthorized user based on the comparison result, the print processing unit 41 and/or the error processing unit 42 perform processes according to the control settings for the printing process and/or the error process. Also when the requesting user is determined to be an unauthorized user, the update condition determining unit 26 determines whether an update condition(s) is satisfied. If the update condition is satisfied, the information registration unit 24 updates the user information registered as the comparison data 31D.

Thus, the image processing apparatus 100 of the second embodiment provides advantageous effects similar to those described in the first embodiment and also makes it possible to use the unauthorized use preventing function without complicating the administrative work and without reducing the convenience of the user.

The unauthorized use preventing function of the above embodiments may be implemented, for example, by executing a program(s), which is written in a programming language supported by the operating environment (platform) of the image processing apparatus 100, using a processing unit (i.e., the CPU 111) of the image processing apparatus 100.

The program may be stored in a non-transitory computer-readable storage medium (e.g., the storage medium 114a) such as a CD, a DVD, an SD card, or a USB memory. For example, the program stored in the storage medium 114a may be installed in the image processing apparatus 100 via the external storage I/F 114. Alternatively, the program may be downloaded and installed via a telecommunication line and the network I/F 113 into the image processing apparatus 100.

In the above embodiments, the printing function is used as an example of functions of the image processing apparatus 100 the unauthorized use of which is to be prevented. However, the unauthorized use preventing function of the above embodiments may be applied to other image functions of the image processing apparatus 100. For example, the image processing apparatus 100 may include an image scanning function and the unauthorized use preventing function may be applied to the image scanning function.

Also in the above embodiments, it is assumed that the information processing apparatus 200 is a personal computer. However, the information processing apparatus 200 is not limited to a personal computer. For example, the information processing apparatus 200 may be an information terminal such as a personal digital assistant (PDA).

The unauthorized use preventing function may also be applied to a pull-print system. In a pull-print system, print jobs from the information processing apparatuses 200 are stored in a management server, and the image processing apparatus 100 obtains the print jobs from the management server and executes the print jobs. In such a pull-print system, the unauthorized use preventing function may be included in the management server. In this case, the print processing unit 41 of the management server sends an authorized print job (that is sent by a user who is determined to be an authorized user) to the image processing apparatus 100 connected to the management server and thereby requests the image processing apparatus 100 to execute the authorized print job. Thus, the unauthorized use preventing function of the above embodiments may be applied to apparatuses other than the image processing apparatus 100.

As described above, an aspect of this disclosure provides an image processing apparatus, an unauthorized use preventing method, and a storage medium storing an unauthorized use preventing program that make it possible to prevent unauthorized use of functions without increasing the management costs and without reducing the convenience of the user.

The present invention is not limited to the specifically disclosed embodiments, and variations and modifications may be made without departing from the scope of the present invention.

What is claimed is:

1. An image processing apparatus connected via a data communication channel to an information processing apparatus, the image processing apparatus comprising:
   a storing unit configured to store comparison data;
   an analysis unit configured to analyze a print job sent by a requesting user from the information processing apparatus to obtain user information of the requesting user;
   a setting unit configured to set the user information to be obtained by the analysis unit,
      wherein the analysis unit is configured to obtain the user information set by the setting unit by analyzing the print job;
   a comparison unit configured to compare the obtained user information with the comparison data to determine whether registered user information corresponding to the obtained user information is present in the comparison data;
   a registration unit configured to register the obtained user information as the comparison data of an authorized user if the registered user information corresponding to the obtained user information is not present in the comparison data, wherein
      the comparison unit is configured to control execution of a printing process and/or an error process if the registered user information corresponding to the obtained user information is present in the comparison data,
   the setting unit is configured to set the user information including user identification information and user related information,
   the analysis unit is configured to obtain the user identification information and the user related information by analyzing the print job,
   the registration unit is configured to register the user identification information and the user related information in association with each other as the comparison data, and
   the comparison unit is configured to
      identify the user related information of the requesting user in the comparison data based on the user identification information obtained by analyzing the print job, and
      compare the user related information obtained by analyzing the print job with the identified user related information in the comparison data to determine whether the requesting user is the authorized user;
   a recording unit configured to record usage history information indicating a history of usage of a printing function of the image processing apparatus by the requesting user; and
   an update condition determining unit configured to determine whether to update the registered user information in the comparison data, wherein
      the setting unit is further configured to set an update condition for the registered user information in the comparison data, and
      when the comparison unit determines that the requesting user is not the authorized user, the update condition determining unit determines whether to update the registered user information of the requesting user by determining whether the update condition is satisfied based on the usage history information of the requesting user.

2. The image processing apparatus as claimed in claim 1, wherein the comparison unit is configured to execute the printing process
   when the obtained user information is registered as the comparison data by the registration unit, and/or
   when the user related information obtained by analyzing the print job matches the identified user related information in the comparison data and the requesting user is determined to be the authorized user.

3. The image processing apparatus as claimed in claim 1, wherein the comparison unit is configured to execute the error process when the user related information obtained by analyzing the print job does not match the identified user related information in the comparison data and the requesting user is determined to be not the authorized user.

4. The image processing apparatus as claimed in claim 1, wherein
   the setting unit is further configured to set details of the printing process and/or the error process to be performed when the requesting user is determined to be not the authorized user; and
   the comparison unit is configured to execute the printing process and/or the error process set by the setting unit when the requesting user is determined to be not the authorized user.

5. The image processing apparatus as claimed in claim 1, wherein when the update condition determining unit determines that the update condition is satisfied, the registration unit updates the registered user information of the requesting user in the comparison data with the obtained user information obtained by analyzing the print job sent by the requesting user.

6. A method performed by an image processing apparatus connected via a data communication channel to an information processing apparatus, the method comprising:
   analyzing a print job sent by a requesting user from the information processing apparatus to obtain user information of the requesting user;
   setting the user information to be obtained;
   obtaining the set user information by analyzing the print job;
   comparing the obtained user information with comparison data stored in a storage unit of the image processing apparatus to determine whether registered user information corresponding to the obtained user information is present in the comparison data;
   registering the obtained user information as the comparison data of an authorized user if the registered user information corresponding to the obtained user information is not present in the comparison data;
   controlling execution of a printing process and/or an error process if the registered user information corresponding to the obtained user information is present in the comparison data;
   setting the user information including user identification information and user related information;
   obtaining the user identification information and the user related information by analyzing the print job;
   registering the user identification information and the user related information in association with each other as the comparison data;
   identifying the user related information of the requesting user in the comparison data based on the user identification information obtained by analyzing the print job;
   comparing the user related information obtained by analyzing the print job with the identified user related information in the comparison data to determine whether the requesting user is the authorized user;
   recording usage history information indicating a history of usage of a printing function of the image processing apparatus by the requesting user;
   determining whether to update the registered user information in the comparison data;
   setting an update condition for the registered user information in the comparison data; and
   when determining that the requesting user is not the authorized user, determining whether to update the registered user information of the requesting user by determining whether the update condition is satisfied based on the usage history information of the requesting user.

7. A non-transitory computer-readable storage medium storing program code for causing an image processing apparatus connected via a data communication channel to an information processing apparatus to perform a method comprising:
   analyzing a print job sent by a requesting user from the information processing apparatus to obtain user information of the requesting user;
   setting the user information to be obtained;
   obtaining the set user information by analyzing the print job;
   comparing the obtained user information with comparison data stored in a storage unit of the image processing apparatus to determine whether registered user information corresponding to the obtained user information is present in the comparison data;
   registering the obtained user information as the comparison data of an authorized user if the registered user information corresponding to the obtained user information is not present in the comparison data;
   controlling execution of a printing process and/or an error process if the registered user information corresponding to the obtained user information is present in the comparison data;
   setting the user information including user identification information and user related information;
   obtaining the user identification information and the user related information by analyzing the print job;
   registering the user identification information and the user related information in association with each other as the comparison data;
   identifying the user related information of the requesting user in the comparison data based on the user identification information obtained by analyzing the print job;
   comparing the user related information obtained by analyzing the print job with the identified user related information in the comparison data to determine whether the requesting user is the authorized user;
   recording usage history information indicating a history of usage of a printing function of the image processing apparatus by the requesting user;
   determining whether to update the registered user information in the comparison data;
   setting an update condition for the registered user information in the comparison data; and
   when determining that the requesting user is not the authorized user, determining whether to update the registered user information of the requesting user by determining whether the update condition is satisfied based on the usage history information of the requesting user.

8. The image processing apparatus as claimed in claim 1, wherein
   the comparison unit is configured to compare the user identification information included in the obtained user information with the comparison data to determine whether the registered user information corresponding to the obtained user information is present in the comparison data, and compare the user related information included in the obtained user information with the comparison data to determine whether the registered user related information corresponding to the obtained user information is present in the comparison data to determine whether the requesting user is the authorized user if the registered user identification information corresponding to the user identification information included in the obtained user information is present in the comparison data; and
   the registration unit is configured to register the obtained user information as the comparison data of the authorized user if the registered user identification information corresponding to the user identification information included in the obtained user information is not present in the comparison data.

9. The method as claimed in claim 6, further comprising executing the printing process when the obtained user information is registered as the comparison data, and/or when the user related information obtained by analyzing the print job matches the identified user related information in the comparison data and the requesting user is determined to be the authorized user.

10. The method as claimed in claim 6, further comprising executing the error process when the user related information obtained by analyzing the print job does not match the identified user related information in the comparison data and the requesting user is determined to be not the authorized user.

11. The method as claimed in claim 6, further comprising:
setting details of the printing process and/or the error process to be performed when the requesting user is determined to be not the authorized user; and
executing the printing process and/or the error process set when the requesting user is determined to be not the authorized user.

12. The method as claimed in claim 6, further comprising updating the registered user information of the requesting user in the comparison data with the obtained user information obtained by analyzing the print job sent by the requesting user, when determining that the update condition is satisfied.

13. The method as claimed in claim 6, further comprising:
comparing the user identification information included in the obtained user information with the comparison data to determine whether the registered user information corresponding to the obtained user information is present in the comparison data;

comparing the user related information included in the obtained user information with the comparison data to determine whether the registered user related information corresponding to the obtained user information is present in the comparison data to determine whether the requesting user is the authorized user if the registered user identification information corresponding to the user identification information included in the obtained user information is present in the comparison data; and registering the obtained user information as the comparison data of the authorized user if the registered user identification information corresponding to the user identification information included in the obtained user information is not present in the comparison data.

* * * * *